April 17, 1951

C. W. HALL 2,549,081

VERTICAL VENDING MACHINE

Filed Jan. 31, 1946

INVENTOR.
Clyde W. Hall,
BY Baird Freeman
Attys.

April 17, 1951 — C. W. HALL — 2,549,081
VERTICAL VENDING MACHINE
Filed Jan. 31, 1946 — 9 Sheets-Sheet 6

INVENTOR.
Clyde W. Hall,
BY Bair & Freeman
Attys.

Fig. 10.

April 17, 1951  C. W. HALL  2,549,081
VERTICAL VENDING MACHINE
Filed Jan. 31, 1946  9 Sheets-Sheet 9

Patented Apr. 17, 1951

2,549,081

UNITED STATES PATENT OFFICE 2,549,081

VERTICAL VENDING MACHINE

Clyde W. Hall, Chicago, Ill., assignor, by mesne assignments, to Highway Steel Products Company, Chicago Heights, Ill., a corporation of Illinois Application January 31, 1946, Serial No. 644,473

9 Claims. (Cl. 312—48)

The present invention relates to vending machines of the type for dispensing, directly to the customer, a unit number of articles incident to each operation of the machine. The machine herein disclosed is particularly adapted for dispensing bottled mechandise, either refrigerated or unrefrigerated, such as various types of beverages. While the machine is herein shown and described as being constructed and arranged for dispensing of bottled merchandise, it will be apparent that it is also applicable for dispensing of various other types of articles or packaged merchandise.

More particularly, the present invention is directed to vending machines of the gravity feed type, provided with suitable coin controlling mechanism for operating the machine and effect dispensing of a unit number of articles of merchandise upon each actuation of the coin control mechanism, incident to insertion of the proper denomination of coin therein.

One of the objects of the present invention is to provide a novel and improved vending machine which is constructed and arranged for storing, preparatory to dispensing, a relatively large number of bottles of beverage in proportion to the overall size and floor area occupied by the machine.

It is also an object of this invention to provide an improved vending machine of the gravity feed type and wherein the mechanism is constructed and arranged so as to completely dispense with the use of all forms of springs, so as to insure a maximum permissible period of operation, and increased revenue, with a minimum amount of servicing of the mechanism.

Another object is to provide an improved vending machine of the gravity feed type, comprising a series of upwardly extending storage magazines, each of which is in open communication at its lower end with a single, inclined hopper for dispensing of the merchandise by a single delivery means.

A further object is to provide a gravity feed type vending machine for dispensing bottled merchandise, provided with a series of upright magazines, arranged for feeding at their lower end into a single inclined hopper for dispensing by single delivery means, together with separate means associated with all except the last magazine of the series, for precluding feeding of bottles into the hopper from one magazine until all bottles are dispensed from the next preceding magazine of the series.

Still a further object is to provide in a gravity feed type vending machine, a novel construction and arrangement of means for expediting reloading of the magazines.

And still another object is to provide in a gravity feed type vending machine, for vending refrigerated or chilled bottles of merchandise, a novel construction and arrangement for preventing feeding of bottles from one or more magazines, so as to insure proper pre-cooling of the bottled goods before being dispensed.

Another object is to provide a novel construction and arrangement of magazines in a gravity feed type vending machine for dispensing bottled merchandise, to insure proper positioning of the bottles in the magazine and to insure efficient and quiet feeding of the bottles from the magazine.

A still further object is to provide an improved vending machine having novel delivery means and a power driven control therefor, adapted to be actuated by coin controlled mechanism for controlling the dispensing of a unit quantity of material under influence of the forces of gravity acting on the material.

It is also an object of this invention to provide in a gravity feed type vending machine, a novel delivery means and power driven control therefor to permit obtaining uniform dispensing of articles of merchandise under influence of gravity.

A further object is to provide an improved vending machine for dispensing cooled bottled goods, characterized by the provision of a closure for a dispensing opening in the cabinet of the machine, adapted to be moved upon engagement therewith by a bottle being dispensed for causing the closure to assume an outwardly and downwardly inclined position to constitute an externally accessible final delivery station for the dispensed bottle.

Other objects and advantages of this invention will be apparent from the following description, taken in connection with the accompanying drawings, in which.

The vending mechanism is completely enclosed within an insulated cabinet 10, which, it may be understood, is provided with suitable refrigerating apparatus not shown. The front of the cabinet is provided with a pair of hinged doors 11 which, when moved to open position, afford convenient access to the vending mechanism therein. It is to be understood that the cabinet may be provided with a suitable lock controlled latching structure, not shown, for maintaining the doors 11 in a closed position to preclude unauthorized access to the interior of the cabinet.

Mounted on one of the doors is a suitable coin controlled mechanism 14, of conventional construction, now commercially available, having a coin slot 15, and a return coin chute 16. The coin controlled mechanism is of the electrically operated type, and is set into operation upon the insertion of a proper denomination of coin in the slot 15, which serves to energize an electric motor and which in turn controls the actual dispensing of merchandise from the machine. The control mechanism includes apparatus by virtue of which the motor circuit is maintained completed for a predetermined period of time until a bottle is dispensed by the mechanism, at which time the motor circuit is then broken and the control mechanism reset for another operation. Since the control mechanism per se does not constitute a part of the present invention, it is believed unnecessary to make any further disclosure thereof, especially in view of the fact that it is commercially available as a complete assembly.

The vending mechanism mounted within the refrigerated chamber of the cabinet 10, is a unitary structure which may be quickly and easily inserted in, or removed from the chamber of the cabinet so as to make it convenient for repair or replacement of a total unit. The vending mechanism includes side plates 20 and 21 at the lower end thereof, which extend in an upwardly inclined direction. The forward or lower ends of these side plates are rigidly attached to a sheet metal frame 24, of generally U-shaped formation, as clearly seen in Figure 10 of the drawings. The side plates are rigidly tied together by a plurality of longitudinally spaced apart, transversely extending tie rods 26. Welded on said tie rods are three, transversely spaced apart, longitudinally extending rods 28, 29 and 30, which are upwardly inclined in the direction and extending the full length of the side plates 20, as clearly seen in Figure 3 of the drawings. The two rods 29 and 30 are closely spaced apart and are adapted to support the main body portion of the bottle. The guide rod 28 is disposed at a slightly higher inclined plane than the rods 29 and 30, in a position to be engaged by and support the neck portion of the bottles, as will hereinafter be described. The lower portion of the machine, as defined by the side plate 20, and the rods 28, 29 and 30, may, for convenience, be considered as an inclined hopper, designated generally at A, down which the bottles, as indicated at B, are adapted to move under influence of gravity. The rods 28, 29 and 30 constitute a guide and support for the bottles as they feed down the inclined hopper for dispensing. Thus the bottles are permitted to freely roll or slide down the rods of the hopper with minimum frictional resistance.

Extending upwardly from the side plate 20, at the inner side of the mechanism, adjacent the doors, are structural framing members 32. Said framing members are rigidly attached at their lower ends to supporting plates 33 which are welded to the side member 20, and the upper ends of said members are rigidly connected as by welding, to a horizontally extending tie angle member 34. The members 32 are spaced apart in sets, in the longitudinal direction of the hopper, so as to define a series of vertically disposed magazines C, for storing the bottles B. The members 32 are provided with laterally extending flanges 35, and the pair of members which define each magazine, have their respective flanges extending toward each other, and thus constitute guides for the bases of the bottles in the magazine.

Figure 1:
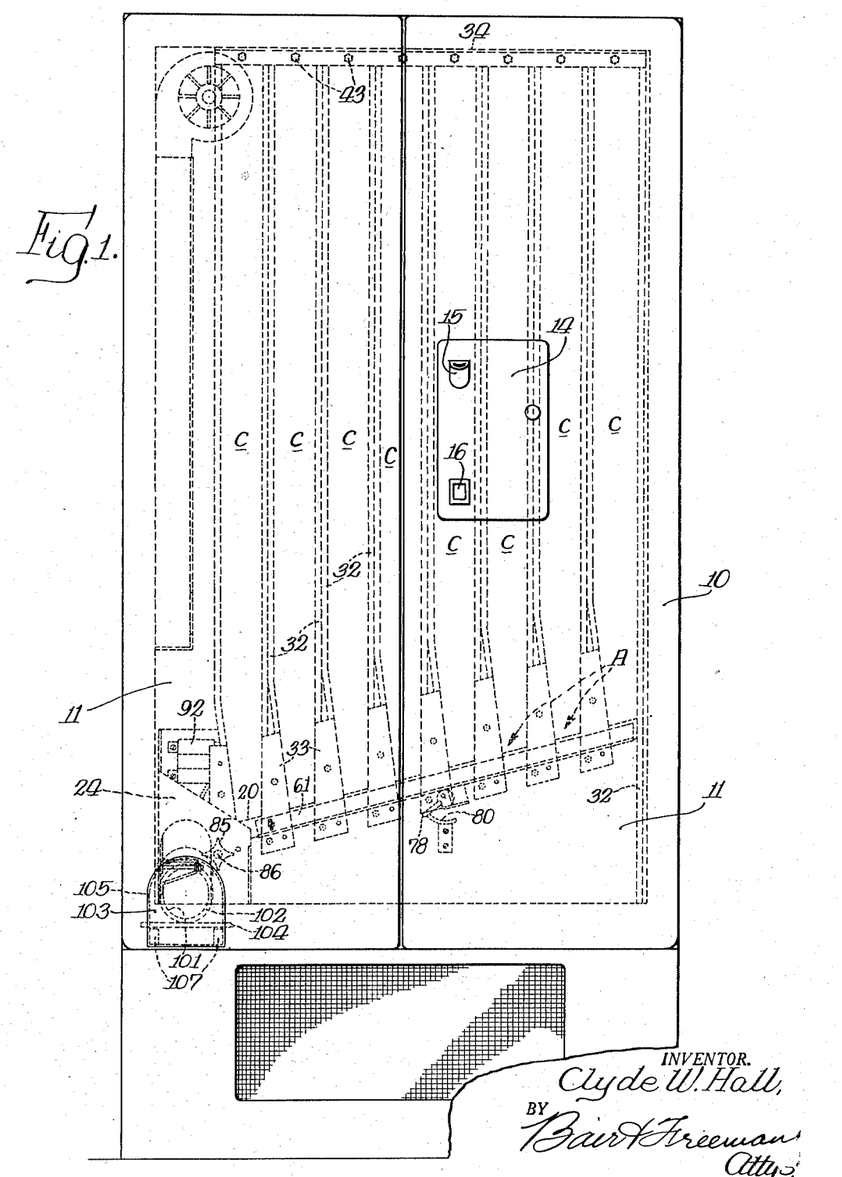
Figure 1 is a front elevational view of the vending machine embodying the present invention, with the vending mechanism represented in dotted lines, within a refrigerated cabinet.
Figure 2:
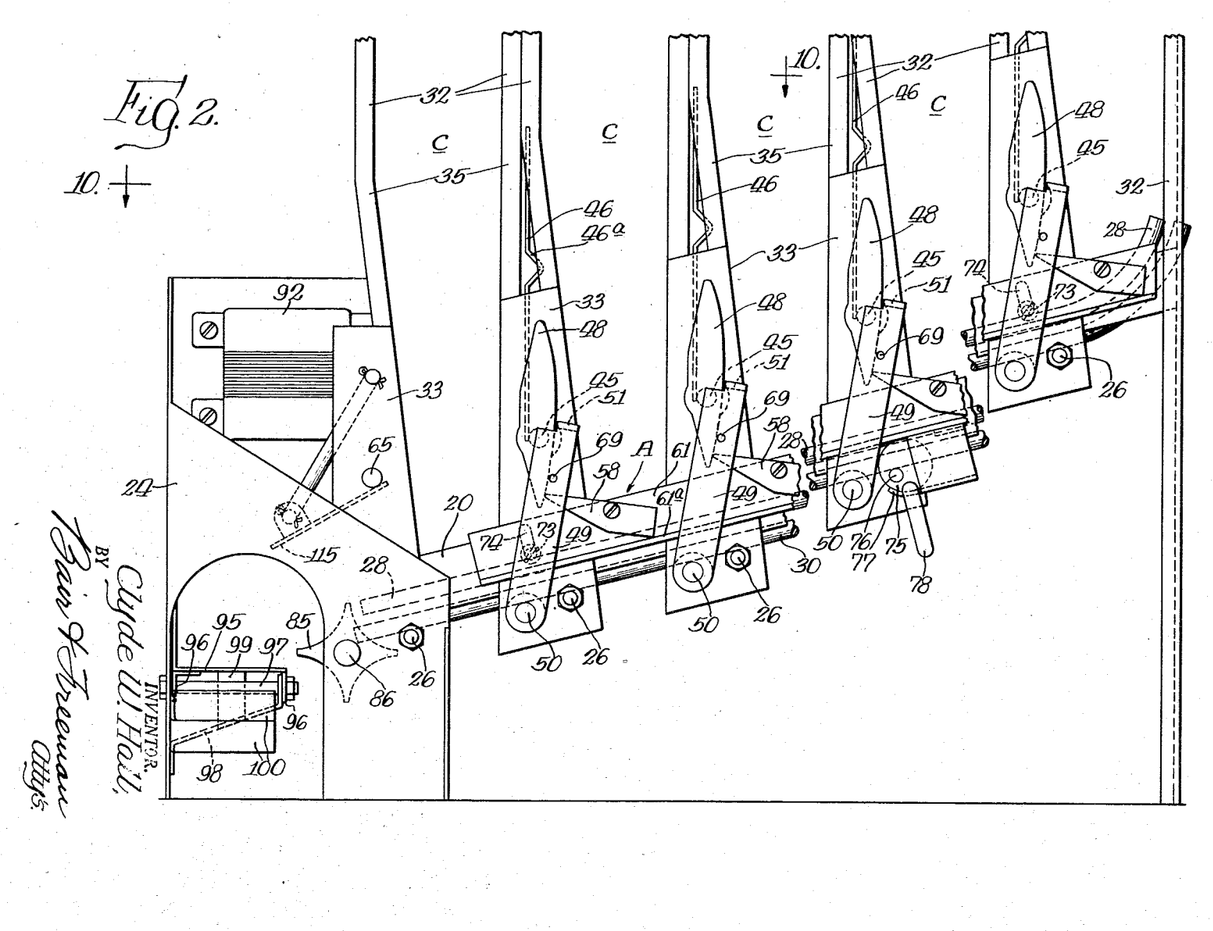
Figure 2 is an enlarged, fragmentary view of the lower portion of the vending mechanism, shown in an empty condition, and with parts adjusted preparatory for reloading.
Figure 3:
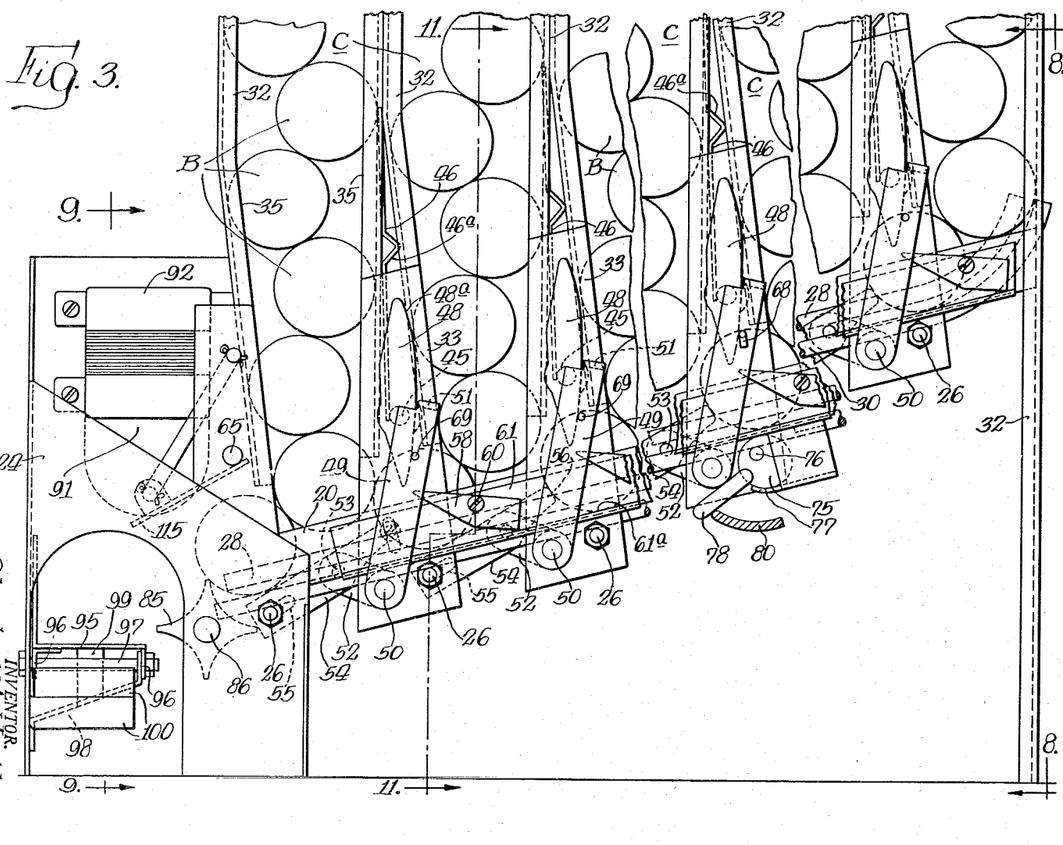
Figure 3 is a view similar to Figure 2 with the various magazines of the mechanism completely loaded with bottles, and the mechanism in condition for dispensing.
Figure 7:
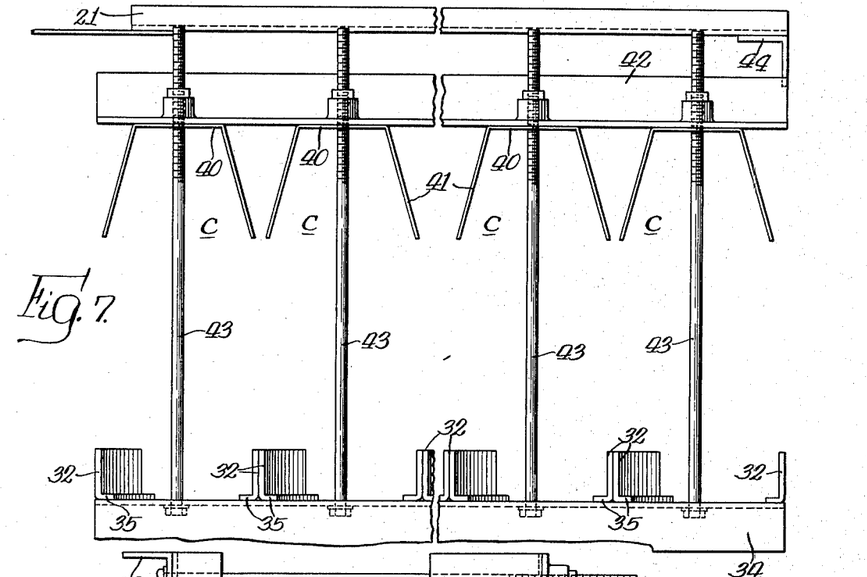
Figure 7 is a top view of the magazines and frame structure.
Figure 10:
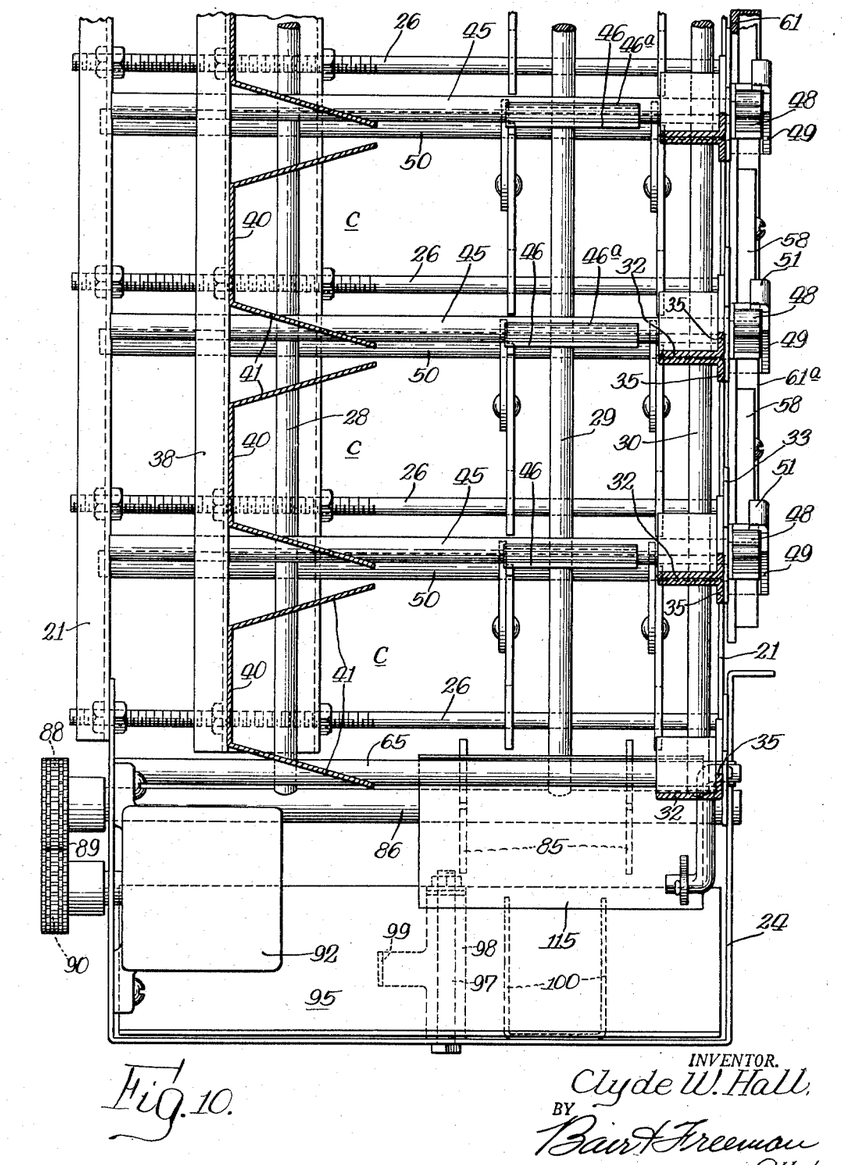
Figure 10 is a horizontal sectional view through the mechanism, taken substantially as indicated at line 10—10 on Figure 2.
Figure 11:
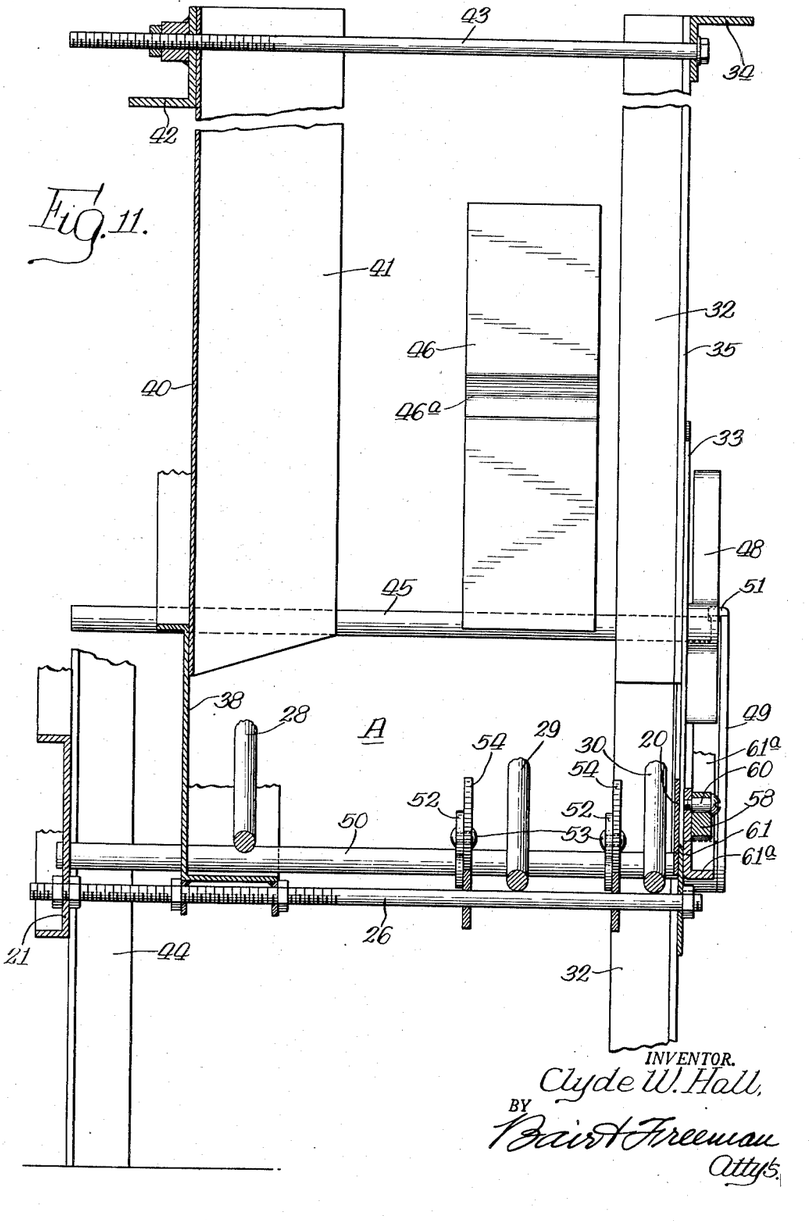
Figure 11 is an enlarged vertical, staggered sectional view, taken as indicated at line 11—11 on Figure 3.

Supported on the tie rods 26, adjacent side plate 21, as seen in Figure 11, is an upwardly inclined side plate 38 which constitutes the opposite side wall of the hopper A. Extending vertically, and secured at their lower ends to the side plate 38, as by welding, are guideways 40 for each of the magazines of the series. Each of the guideways is of generally U-shaped formation in cross section, as seen in Figure 10 of the drawings, and includes a pair of converging walls 41. Each of the guideways is located substantially in central alignment with the vertical median plane of the magazines, viewed in endwise relation, as seen in Figures 3 and 10 of the drawings. The upper ends of the guideways 40 are connected as by welding, to a horizontally extending tie angle member 42 and the tie angle members 34 and 42, at opposite sides of the upper end of the magazines are connected together by tie rods 43. Connected to the elevated end of the side plate 21, and to the frame structure, as seen in Figure 7, is an angle iron 44 which, with the frame member 24 and the right hand end member 32, as seen in Figures 2 and 3, serves to support the entire mechanism in upright position.

The distance between the inner face of the flanges 35, at the front ends of the magazines and the flat central portions of the guideways 40, at the opposite end of the magazines, defines the length of each magazine, and the magazines serve to accommodate therein, a multiplicity of bottles B, disposed in superimposed relation, with their axes extending approximately horizontally. For accommodating bottles of different lengths, the guideways 40 may be moved toward or away from the guides 32 by adjusting the tie rods 26 and 43, as clearly seen in Figure 11 of the drawings.

Figure 8:
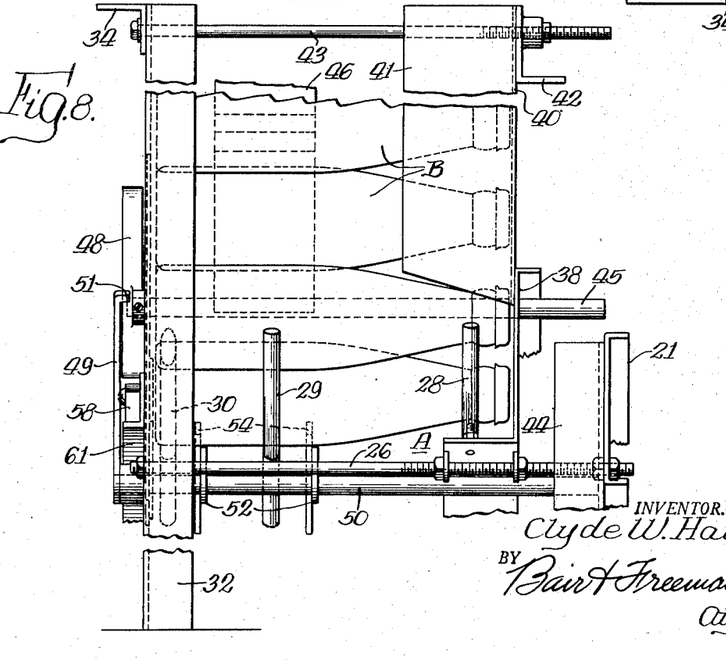
Figure 8 is a rear end view of the mechanism, taken substantially as indicated at line 8—8 on Figure 3.

The distance between the adjacent framing members 32 of each magazine is such as to provide a magazine of such width as to permit stacking of bottles in the magazines in superimposed relation, as clearly seen in Figures 3 and 8 of the drawings, with one bottle disposed in laterally staggered relation to the next bottle in the magazine and with their axes laterally offset from each other, to insure that the base of each bottle is guided by one of the flanges 35 of the magazine frame elements 32. It will thus be apparent that it will not be possible to stack two bottles in vertical alignment, one upon the other in a magazine, and because of the off-center relationship of the axis of one bottle, the next superimposed bottle will be caused to assume a position at the opposite side of the magazine, as seen in Figure 3.

It is well known that the majority of bottles containing beverages adapted to be dispensed are produced with a slight longitudinal draft or taper reducing in the direction from the base of the body of the bottle, so that the body adjacent the shoulder or neck portion is slightly smaller in diameter than the diameter of the body at the base end. Upon insertion of a bottle into a magazine, the outer end of the neck portion of the bottle is caused to engage one of the converging surfaces 41 of the guideway 40, in a manner tending to cause the bottle to assume a substantially horizontal position in the magazine, and thus tending to compensate for the taper of the body of the bottle.

By virtue of the dimensional relationship of the guide flanges 35 of the magazine for guiding the base ends of the bottles, and the converging walls 41 at the opposite end of the magazine, a bottle is caused to assume a laterally offset position with respect to the next lower bottle in the magazine. The neck of the bottle, by reason of its engagement with one of the converging walls 41, causes the bottle to move in a horizontal plane, so that the axis of the bottle, at the neck end, is closer to the axis of the next lower bottle, at the neck end, than are the axes of the two bottles at their base ends, when considered with respect to a horizontal plane. Thus the shoulder portion of a bottle contacts the shoulder portion of the next lower bottle at a higher vertical plane than the areas of contact of the base portions of said two bottles, and thus compensates for said taper or draft of the body of the bottles. By this arrangement, the bottles in a magazine are caused to assume a position with their axes extending in approximately horizontal planes. In the absence of such a construction, as above described, a plurality of superimposed bottles in a vertical magazine would cause successive bottles to increase in their angle of tilt, with respect to the lower bottles in the magazine, so that the uppermost bottles in the magazine would have their neck ends disposed below the lowermost portion of the base of the respective bottles. It is this difficulty which the foregoing construction is intended to obviate, as well as insuring elimination of the substantial noise and possible wedging of bottles as they are fed from the magazine into the dispensing hopper A.

As may be observed in the drawings, the lower end of each magazine is in open communication with the inclined hopper A. Suitable means is provided for controlling the feeding of the bottles from the magazines into the hopper in a manner so that all bottles must first be fed out of one magazine, into the hopper, before the bottles from the next adjacent magazine are permitted to feed into the hopper. For this purpose, I provide separate blocking means, associated with each magazine, except the last magazine of the series, for controlling the feeding of the bottles into the hopper. The blocking means for one magazine will now be described, and it may be understood that corresponding elements constitute the blocking means for each of the other magazines as above referred to. Journaled in the plate 33 at the front side, and in the side plate 21 at the opposite side of the hopper, is a rock shaft 45, to which is welded a bottle follower arm 46. The end of the rock shaft, at the front side of the machine, has rigidly attached thereto a control cam 48, disposed on the outside of the plate 33. Cooperating with the cam is a control arm 49, mounted on a rock shaft 50, journaled in the lower portion of the plate 33 at one end, and the opposite end being journaled in the opposite side member 21 of the hopper. The upper end of the arm 49 is provided with an inturned lug 51, which is adapted to cooperate with the cam surface 48a of the cam 48, for controlling the position of the bottle follower arm 46, in a certain position, and said cam serving to control movement of the arm 49 incident to the weight of the bottles in the magazine as hereinafter described. Rigidly attached to the rock shaft 50, in transversely spaced apart relation, are two separate levers 52, which are pivoted at 53, at their outer ends, to separate blocking dogs 54 intermediate their length. As may be seen in Figures 10 and 11 of the drawings, the blocking dogs 54 are spaced transversely apart, on opposite sides of the bottle supporting rod 29, in the hopper, in a position so as to engage the body portion of the bottle as it is fed down the inclined hopper. One end of said dogs is slotted as indicated at 55, and surrounds an adjacent tie rod 26 to permit longitudinal movement of the dogs. The opposite end of the dogs 54 terminates in a nose 56, which normally extends a substantial distance above the bottle supporting rods 29 and 30, as seen in Figure 3, in a position to be encountered by the body of a bottle tending to move down the inclined hopper A, under influence of gravity. In such position said dogs serve to block movement of said bottles. Co-acting with the control arm 49, is a gravity actuated detent pawl 58. The pawl for each of the control mechanisms associated with each of the respective magazines, may be pivotally mounted directly on the adjacent side member 20 of the hopper A. For convenience in loading the magazines, as will hereinafter be described, each of the respective gravity actuated detent pawls 58 is pivoted at 60 to a single carrier member 61, movably mounted adjacent the hopper side 20. It thus will be apparent that the bottle follower arm 46, through its cam 48, moves under control of the arm 49, due to the relationship of the lug 51 of said arm co-acting with the cam surface 48a of said cam 48.

When the machine is to be conditioned for loading the magazines with bottles B, the respective blocking mechanisms are adjusted to the position seen in Figure 2 of the drawings, and movement of the bottle follower arms 46 to an upright position is permitted by first moving the control arms 49 clockwise, after which each of said cams 48, and follower arms 46 may be moved to an upright position, as seen in Figure 2. In this position, the gravity actuated pawls 58, associated therewith, move into detent relation to lock said cams and bottle follower arms in such upright position, as seen in Figure 2. Such movement of the control arms 49 positions the blocking dogs 54 so that their blocking noses 56 are in an operative bottle blocking position as seen in Figure 3 of the drawings. After the respective magazines C are loaded with one or more bottles B, the lowermost bottle in each magazine rests in direct contact with the blocking dog 54, tending to move it downwardly under the weight of all the bottles in the magazine, as may be seen in Figure 3. The gravity pawls 58 are then moved out of engagement with their cams 48, and the reactive force of the weight of bottles in the magazine is transmitted from the blocking dogs, through the levers 52 to the rock shafts 50, tending to cause the control arm 49 to move in a counter-clockwise direction, and thereby causing its lug 51 to react against the cam surface 48a, which tends to rock shaft 45, in a direction for causing the bottle follower arm 46 to be urged against the bottles in the magazine, as clearly seen in Figure 3 of the drawings.

Figure 4:
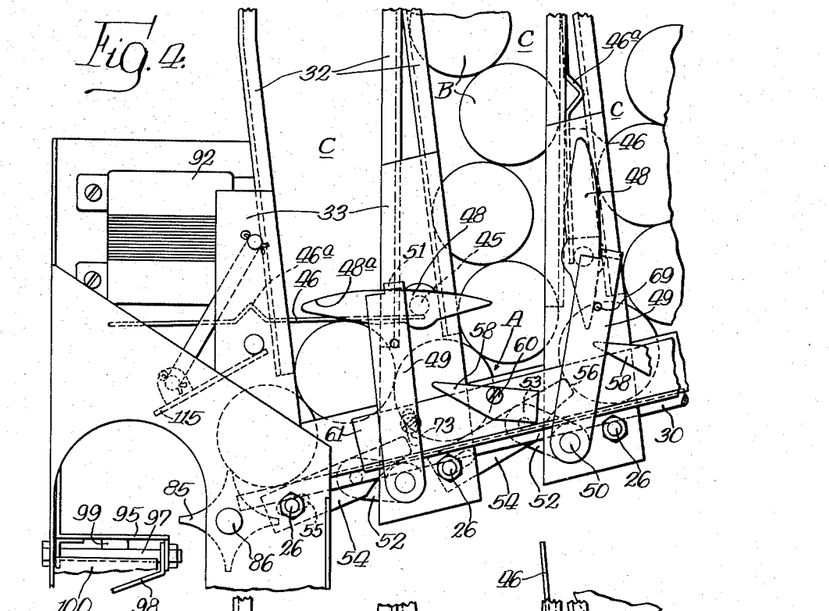
Figure 4 is a fragmentary view similar to Figure 3 showing the position of the bottle holding means associated with the first magazine, approximating a position of adjustment for permitting the feeding into the inclined hopper of the bottles from the next adjacent magazine of the series.
Figure 5:
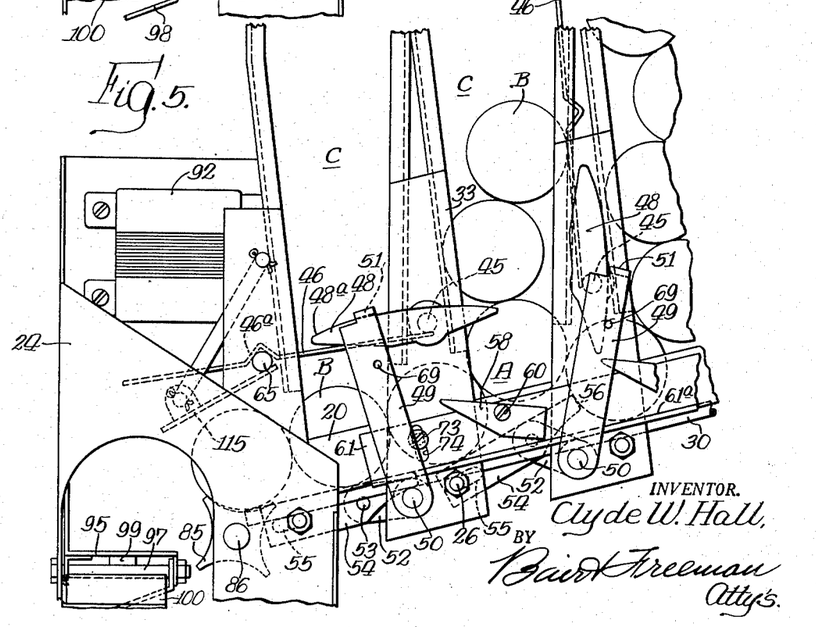
Figure 5 is similar to Figure 4, showing the adjustment of the blocking means associated with the first magazine, in its final releasing position for permitting proper feeding of the bottles into the hopper from the next adjacent magazine.

In the construction illustrated in the drawings, one bottle is dispensed incident to each operation of the machine. The bottles from the first magazine are caused to be first fed into the inclined hopper A, and the blocking dogs associated with the control mechanism of the other magazines remains in operative position to block feeding movement down the inclined hopper of bottles from the other magazines of the series. When the first magazine is gradually emptied of its bottles, the follower arm 46, by the reaction through the linkage above described, tends to follow the last bottle in the magazine in a downward direction as seen in Figure 4 of the drawings. When the last bottle of said magazine, and for example the first magazine, moves completely into the inclined hopper for dispensing, as seen in Figure 5 of the drawings, the bottle follower arm 46 assumes the position seen in Figure 5 of the drawings. Thus the follower arm 46 is permitted to move downwardly no faster than the bottles of the magazine are fed into the hopper, and such downward movement of the bottle follower arm is caused by the control arm 49 acting upon the cam 48, until the parts assume a position as seen in Figure 5 of the drawings, at which time the blocking dogs 54 have moved down and out of the path of travel of the bottles to be fed down the inclined hopper, from the next adjacent magazine as clearly seen in Figure 5 of the drawings, thus permitting feeding of the bottles from the next adjacent magazine into the inclined hopper. It is to be understood that such movement of the control and blocking means for each magazine is relatively slow and gradual so that the first bottle, from the next magazine to the one previously emptied, is permitted to gradually move under influence of the action of gravity of all bottles in said magazine, into the inclined hopper, during which time it is in engagement with the last bottle discharging from the magazine just being emptied, as seen in Figures 4 and 5.

The follower arms area each formed with a transverse seat 46a, in a position so as to permit engagement with, and be supported upon the rock shaft 45, associated with the previous magazine, with the exception of the first magazine. For the follower arm of the first magazine, said seat 46a engages fixed rod 65, carried by the plate 33 and side plate 21. Thus as the first magazine is emptied of its bottles, the blocking dogs 54 associated therewith assume a position as seen in Figure 5 of the drawings, so that the bottles from subsequent magazines may freely move thereover as they feed down the inclined hopper. Due to the position of the lug 51 of the control arm 49, with respect to the cam 48, when the magazine is empty, as seen in Figure 5 of the drawings, the parts are temporarily locked in such position against movement so that the follower arms 46 as seen in Figures 5 and 6 of the drawings are held down, so as to constitute a top guard for the hopper, to prevent upfeeding of bottles into an empty magazine, as the bottles feed down the inclined hopper, from one of the subsequent magazines.

When it is desired to prevent feeding of bottles from one or more of the last magazines of the entire series, such as when it is desired to maintain a stock of bottles within the refrigerated chamber for a period of time to insure pre-cooling, the control mechanism associated with those respective magazines may be adjusted so as to preclude feeding of such bottles out of such magazines. For this purpose, when the magazines have been loaded and before the gravity pawls 58 are moved out of operative relation to the cams 48, a suitable pin, such as indicated at 68 in Figure 3 of the drawings, may be inserted in an aperture 69, formed in the control arm 49, which is located at a position so that said pin will engage the tail portion of the cam 48, so that the linkage and parts of one control mechanism will become locked in a blocking relation, as seen with respect to one of the magazines as illustrated in Figure 3 of the drawings. As will be apparent, when the mechanism for one magazine is thus locked, it serves to preclude feeding of bottles from all subsequent magazines.

Figure 6:
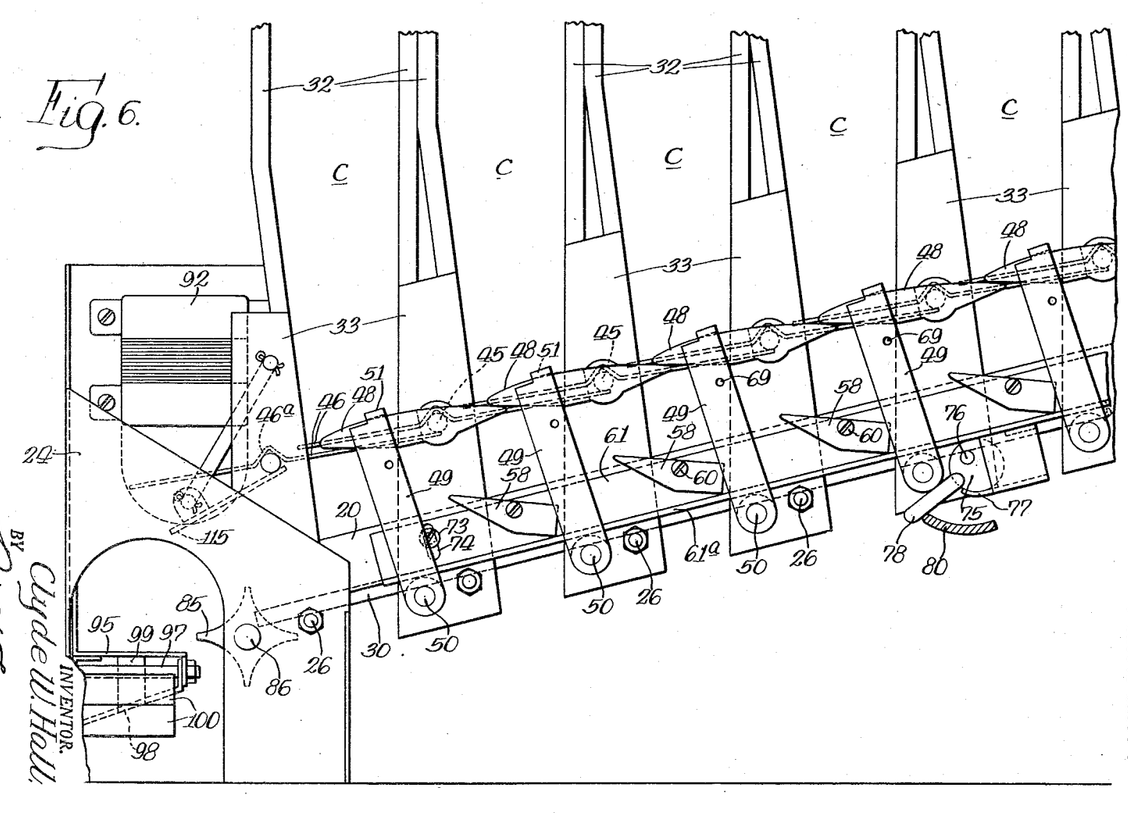
Figure 6 is a view similar to Figure 2, showing the blocking means associated with the magazines in a fully released position, and all magazines of the mechanism completely empty.

To facilitate loading of the magazines, I prefer to mount the gravity pawls 58, as above mentioned, on a common or single carrier member 61, which carrier member is mounted with respect to the front side member 20 of the hopper for vertical movement relatively thereto, by means of headed studs 73, carried by the side member 20, extending through elongated slots 74, in said carrier member 61, as seen in Figure 6 of the drawings. The single carrier member 61, has a laterally extending flange 61a, at its lower edge, with which cooperates a cam 75, pivoted at 76, on the lower portion of the reinforcing plate 33 of one of the intermediate magazine frames; the underside of the cam co-acting with a shoe 77, attached to the lower end of the reinforcing plate 33, as seen in Figures 3 and 6 of the drawings. Connected to the cam 75 is an arm 78, for manually moving the cam to a position for elevating the single carrier member 61, to dispose all of the gravity pawls 58 in a position to automatically lock the cams 48 in an upright position, as seen in Figure 2. To move the cam 48, control arm 49 and bottle follower arm 46 and the blocking dogs 54, associated with the respective magazines, from the position seen in Figure 6 of the drawings to the position seen in Figure 2 of the drawings, merely requires movement of the control arm 49 in clockwise direction, and simultaneously exerting pressure on the cam 48 to rotate it from the position seen in Figure 6 to the position seen in Figure 2, at which time the corresponding gravity pawl 58 automatically engages behind the cam 48, and locks the mechanism in such position, as seen in Figure 2 of the drawings. After the blocking means and bottle follower arm for each of the respective magazines are latched in the position seen in Figure 2 of the drawings, the respective magazines may be reloaded with the bottles B. The single carrier member 61 may then be lowered, manually, if desired, by operation of the cam 75 through the arm 78. To avoid possibility of the attendant of the machine failing to move the cam 75 to the position seen in Figure 3 of the drawings, which would leave the magazines in a blocked, non-feeding condition, I prefer to mount on the right hand door 11 of the cabinet, on the inner face thereof, a cam 80 which will act camwise against said arm 78, when the door is moved to a closed position, for causing said arm 78 to be moved so as to rotate cam 75 to the position seen in Figure 3, thereby causing the single carrier member 61 to move downwardly by the rotation of said cam 75, acting upon the shoe 77, and thereby lowering all of the gravity pawls 58 out of detent relation to their respective cams 48.

One of the important features of the present invention is in the provision of a single delivery or feeding means for dispensing the bottles fed into the inclined hopper from all of the magazines. Mounted adjacent and in registration with the lower end of the hopper is a feeding mechanism, comprising a pair of feeding elements 85, rigidly mounted on a horizontal shaft 86, journaled in the legs of the U-shaped frame member 24. The feeding elements are in the form of four-pointed stars, with the surface intermediate the respective points being of arcuate formation, corresponding approximately to the curved contour of the body portion of the bottles to be dispensed. The two feeding elements are transversely spaced apart and located at a position so as to engage the body portion of the bottles. As shown, the feeding elements are mounted with their axes of rotation disposed below the discharge end of the rods 29 and 30, constituting the bottom of the hopper. However, if desired, a top feeding arrangement may be employed with equally satisfactory results.

Figure 9:
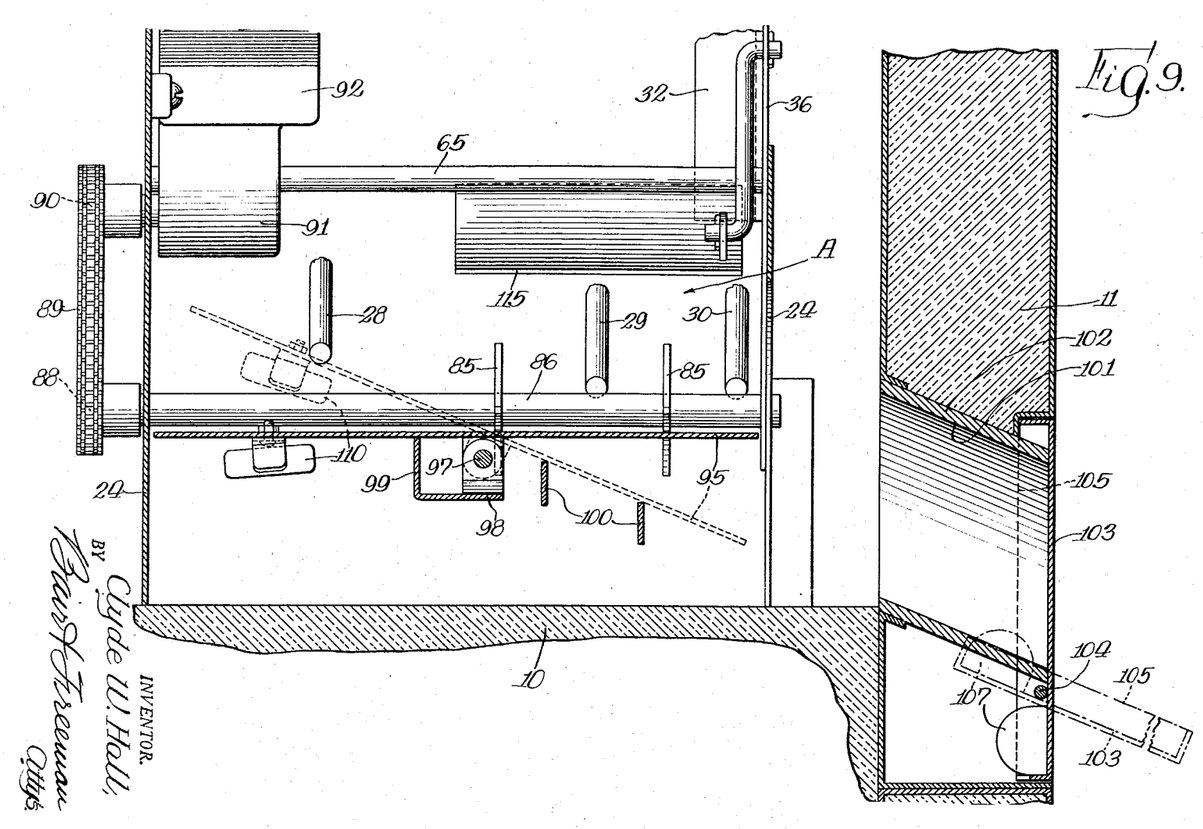
Figure 9 is an enlarged transverse, vertical sectional view through the front end of the mechanism and associated portion of the cabinet, taken substantially as indicated at line 9—9 on Figure 3.

Mounted on the rear end of the shaft 86, beyond the U-shaped frame 24, is a sprocket wheel 88, driven by a chain 89 from a sprocket wheel 90, which is driven by a worm gear speed reducer mechanism indicated generally at 91. Said mechanism 91, is connected to and driven by an electric motor indicated at 92, mounted on the back leg of the frame 24. The motor is caused to be driven each time a coin of the proper denomination is inserted into the control mechanism 14, by virtue of which the feeder elements 85 are caused to rotate a predetermined amount and feed a bottle forwardly from the position seen in Figure 3 of the drawings, for discharging the same on to a tiltable delivery tray indicated generally at 95. As seen in Figure 5 of the drawings, a bottle is shown in the process of being dispensed. The tiltable delivery tray 95 has a pair of depending lugs 96, journaled on a pin 97, secured in the closed end portion of the U-shaped frame 24. The outer or free end of the pin 97 is reinforced and supported by a bracket 98, which includes a laterally extending lug 99, positioned to one side of the axis of the pivot pin 97, as seen in Figure 9, so as to normally support the tray in a substantially horizontal position. When a bottle is discharged on to the delivery tray, due to the maximum weight of the bottle being to the right of the pivot pin, as seen in Figure 9 of the drawings, the delivery tray tilts to an inclined position as seen in dotted lines in Figure 9, and abuts against a pair of stops 100, formed as a part of a U-shaped bracket welded to the inner face of the closed end of the U-shaped frame 24, as seen in Figure 10 of the drawings. When the delivery tray is in the inclined position, it constitutes a chute and the bottle is caused to slide down the inclined surface of the tray through a dispensing opening 101, in one of the doors 11 of the cabinet. The opening is defined by a tubular sleeve 102, and the outer end of said opening on the front side of the door, is provided with a closure element 103, pivotally mounted at 104, adjacent its lower end, as seen in Figure 9 of the drawings, so that the base end of the bottle being discharged from the tiltable tray 95 abuts the closure element 103, and moves it to an outwardly and downwardly inclined position as seen in Figure 9 of the drawings. The closure 103 in this position constitutes an extension of the tray 95 in a tilted position, as seen in Figure 9, and the tube 102, constituting the opening through the door. The upper end of the closure element is of curved formation, and its marginal edge is inturned to form a flange 105, which constitutes a stop against which the base or bottom of the bottle abuts, to arrest the bottle in a convenient position for access to the purchaser. Mounted on the inner face of the closure 103, below the pivot 104, are counterweights 107 which, when the bottel is removed from the closure in its inclined dispensing position, causes the closure to return to an upright position, closing the dispensing opening through the door, and thereby reducing to a minimum the amount of external air that may enter the refrigerated chamber of the cabinet. As the bottle slides off of the tiltable tray 95, said tray by its counterbalanced mounting, again assumes its normal, substantially horizontal position as seen in Figure 9 of the drawings.

Mounted on the underside of the tiltable tray at its rearward end, is a mercury tube switch 110, which, it may be understood, is connected in the electrical circuit of the control mechanism 14, and when the tiltable tray moves to the tilted position seen in Figure 9, said switch 110 opens the control circuit which in turn breaks the circuit to the motor 92. It is also to be understood that a suitable switch (not shown) is desirably mounted in the lower end of the hopper, in a conventional manner, and connected in the electrical control circuit, so that when the last bottle is dispensed from the machine, it in turn will also break the control circuit, through the coin controlled mechanism 14, to maintain the motor circuit inoperative and also render the coin control mechanism 14 inoperative upon insertion of a coin therein, the coin being automatically returned through the return chute 16, when the machine is either empty of bottles, or when the last dispensable bottle has been dispensed, such as may occur when certain magazines are locked in non-dispensing condition, as above described.

It will be apparent that as the feeding elements 85 rotate, the bottle being dispensed may tend to move in an upward direction, due to the gravity force exerted thereon by the other bottles in the hopper, or the gravity force of the bottles in the dispensing magazine. To prevent a bottle from being too rapidly dispensed, or from being dispensed without operation of the motor and coin controlled mechanism, I provide a guard plate 115, secured to the rod 65 and positioned in co-relation to the feeder elements 85 so as to insure confining the bottles in the hopper for movement in a path of travel under full control of the feeding elements 85. Each time the coin control mechanism is actuated, upon insertion of a coin of the proper denomination, the feeder elements 85 rotate a quarter revolution. As one set of points of the feeder wheels move forwardly to effect dispensing of the first bottle at the lower end of the hopper, the next set of points of the feeder elements move to a position to engage the next bottle being fed down the hopper, thereby serving to hold said bottle and all others therebehind, in place in the hopper or magazine, under control of movement of the feeding elements. Thus there is always a tendency for the forces of gravity, acting on the bottles in the hopper or in the magazines, to cause the first bottle at the lower end of the hopper to exert a substantial force on the feeding elements, tending to rotate the same. By virtue of the novel control for the feeding elements, consisting in the motor 92 and worm gear reducing mechanism 91, said feeding elements are accurately controlled so that they may rotate only when the motor 92 is energized, and cannot be overdriven beyond the speed of the motor because of the reactive forces transmitted by the worm gearing, driven by the motor. Thus the motor and worm gearing in effect do not constitute a power drive for effecting a dispensing of the bottles, but properly constitute a control for dispensing of the bottles under the forces of gravity acting on the bottles in the hopper and the magazines. It may be said that the motor and drive function as a brake, that is, when the motor circuit is broken, the worm gearing prevents rotation of the feeder elements 85 by the forces of gravity acting on the bottles in the hopper, and the magazines. Hence when the motor is energized, the worm gear drive controls the speed of movement of the feeder elements upon which gravity forces of the bottles operate and tend to rotate them for effecting dispensing of the bottles. Thus the motor control, including the worm gearing, makes it possible to employ the same dispensing mechanism in connection with vending machines for the dispensing of various size bottles or other articles. Since the motor and drive mechanism merely function as a control, and not as a positive feeding drive, it is possible to utilize an extremely small powered motor.

Although I have herein shown and described a preferred embodiment of my invention, manifestly it is capable of substantial modification and rearrangement of parts without departing from the spirit and scope thereof. I do not, therefore, wish to be understood as limiting this invention to the precise embodiment herein disclosed, except as I may be so limited by the appended claims.

I claim as my invention:

1. In a gravity feed article vending machine for dispensing a unit number of articles incident to actuation of coin controlled mechanism upon insertion of a coin, the combination of a series of upwardly extending magazines adapted to contain stacks of superimposed articles, an inclined hopper in open communication with the bottom of each magazine for receiving articles therefrom under influence of gravity, said hopper having a discharge end adjacent the lower end thereof toward which articles in the hopper move under influence of gravity, delivery means mounted in registration with the discharge end of the hopper in a position to normally hold the articles in the hopper in opposition to the gravity pressure exerted by said articles, power driven means for controlling the delivery means in response to actuation of the coin controlled mechanism, whereby said delivery means effects a dispensing of a unit number of articles from the hopper upon each actuation, separate means associated with the bottom of each magazine and the hopper, adapted to normally block feeding movement down the hopper of articles from the next adjacent magazine, and adapted to be conditioned, incident to feeding of the last article from the magazine, for permitting feeding down the hopper of articles from the next adjacent magazine, said separate means, when its corresponding magazine is empty, being manually movable to operative position for blocking the feed of articles from the next adjacent magazine, for reloading of the corresponding magazine, and a gravity actuated pawl associated with each means for latching said means when it is moved to such position.

2. In a gravity feed article vending machine for dispensing a unit number of articles incident to actuation of coin controlled mechanism upon insertion of a coin, the combination of a series of upwardly extending magazines adapted to contain stacks of superimposed articles, an inclined hopper in open communication with the bottom of each magazine for receiving articles therefrom under influence of gravity, said hopper having a discharge end adjacent the lower end thereof toward which articles in the hopper move under influence of gravity, delivery means mounted in registration with the discharge end of the hopper in a position to normally hold the articles in the hopper in opposition to the gravity pressure exerted by said articles, power driven means for controlling the delivery means in response to actuation of the coin controlled mechanism, whereby said delivery means effects a dispensing of a unit number of articles from the hopper upon each actuation, separate means associated with the bottom of each magazine and the hopper, adapted to normally block feeding movement down the hopper of articles from the next adjacent magazine, and adapted to be conditioned, incident to feeding of the last article from the magazine, for permitting feeding down the hopper of articles from the next adjacent magazine, said separate means, when its magazine is empty, being manually movable to a magazine loading position and blocking the feed of articles down the hopper from the next adjacent magazine, to permit reloading of the magazine, a gravity actuated latching pawl associated with each means and normally disposed in an inoperative position, and manually operated means for simultaneously moving all latching pawls into operative position for holding their corresponding separate means in loading position when the latter are moved to such position.

3. In a gravity feed article vending machine for dispensing a unit number of articles incident to actuation of coin controlled mechanism upon insertion of a coin, the combination of a series of upwardly extending magazines adapted to contain stacks of superimposed articles, an inclined hopper in open communication with the bottom of each magazine for receiving articles therefrom under influence of gravity, said hopper having a discharge end adjacent the lower end thereof toward which articles in the hopper move under influence of gravity, delivery means mounted in registration with the discharge end of the hopper in a position to normally hold the articles in the hopper in opposition to the gravity pressure exerted by said articles, power driven means for controlling the delivery means in response to actuation of the coin controlled mechanism, whereby said delivery means effects a dispensing of a unit number of articles from the hopper upon each actuation, separate means associated with the bottom of each magazine and the hopper, adapted to normally block feeding movement down the hopper of articles from the next adjacent magazine, and adapted to be conditioned, incident to feeding of the last article from the magazine, for permitting feeding down the hopper of articles from the next adjacent magazine, said separate means, when its magazine is empty, being manually movable to a magazine loading position and blocking the feed of articles down the hopper from the next adjacent magazine, to permit reloading of the magazine, a gravity actuated latching pawl associated with each means and normally disposed in an inoperative position, and manually operated means for simultaneously moving all latching pawls into operative position for holding their corresponding separate means in loading position when the latter are moved to such position, said manually operated means comprising a single control member adapted to be moved to a release position, after certain or all magazines have been loaded, for simultaneously moving all pawls out of latching relation to their corresponding separate means.

4. In a gravity feed article vending machine for dispensing a unit number of articles incident to actuation of coin controlled mechanism upon insertion of a coin, the combination of an enclosing cabinet having a door to afford access to the interior thereof, a series of upwardly extending magazines adapted to contain stacks of superimposed articles, an inclined hopper in open communication with the bottom of each magazine for receiving articles therefrom under influence of gravity, said hopper having a discharge end adjacent the lower end thereof toward which articles in the hopper move under influence of gravity, delivery means mounted in registration with the discharge end of the hopper in a position to normally hold the articles in the hopper in opposition to the gravity pressure exerted by said articles, power driven means for controlling the delivery means in response to actuation of the coin controlled mechanism, whereby said delivery means effects a dispensing of a unit number of articles from the hopper upon each actuation, separate means associated with the bottom of each magazine and the hopper, adapted to normally block feeding movement down the hopper of articles from the next adjacent magazine, and adapted to be conditioned, incident to feeding of the last article from the magazine, for permitting feeding down the hopper of articles from the next adjacent magazine, said separate means, when its magazine is empty, being manually movable to a magazine loading position and blocking the feed of articles down the hopper from the next adjacent magazine, to permit reloading of the magazine, a gravity actuated latching pawl associated with each means and normally disposed in an inoperative position, manually operated means for simultaneously moving all latching pawls into operative position for holding their corresponding separate means in loading position when the latter are moved to such position, said manually operated means comprising a single control member, and means on said door of the cabinet adapted, when said door is moved to closed position, to engage said control member for moving it to a released position for simultaneously moving all pawls out of latching relation to their corresponding separate means.

5. In a gravity feed article vending machine for dispensing a unit number of articles incident to actuation of coin controlled mechanism upon insertion of a coin, the combination of a series of upwardly extending magazines adapted to contain stacks of superimposed articles, an inclined hopper in open communication with the bottom of each magazine for receiving articles therefrom under influence of gravity, said hopper having a discharge end adjacent the lower end thereof, toward which articles in the hopper move under influence of gravity, delivery means mounted in registration with the discharge end of the hopper in a position to normally hold the articles in the hopper in opposition to the gravity pressure exerted by said articles, power driven means for controlling the delivery means in response to actuation of the coin controlled mechanism, whereby said delivery means effects a dispensing of a unit number of articles from the hopper upon each actuation, means below each magazine and adapted to partially support the weight of the articles in the magazine and positioned to normally block feeding movement down the hopper of articles from the next adjacent magazine, a control arm pivotally mounted in the lower end of each magazine and adapted to follow the feeding movement of the last articles from the magazine, and separate means interconnecting said blocking means and control arm of each magazine, whereby the pressure exerted on the blocking means by the articles in the magazine urges said arm in the direction of said articles and thereby retains the blocking means in operative position, and when the last articles are dispensed from the magazine, said arm is caused to assume a predetermined position of adjustment and effects movement of the blocking means to an inoperative position to permit feeding down the hopper of articles from the next adjacent magazine.

6. In a gravity feed article vending machine for dispensing a unit number of articles incident to actuation of coin controlled mechanism upon insertion of a coin, the combination of a series of upwardly extending magazines adapted to contain stacks of superimposed articles, an inclined hopper in open communication with the bottom of each magazine for receiving articles therefrom under influence of gravity, said hopper having a discharge end adjacent the lower end thereof toward which articles in the hopper move under influence of gravity, delivery means mounted in registration with the discharge end of the hopper in a position to normally hold the articles in the hopper in opposition to the gravity pressure exerted by said articles, power driven means for controlling the delivery means in response to actuation of the coin controlled mechanism, whereby said delivery means effects a dispensing of a unit number of articles from the hopper upon each actuation, means below each magazine and adapted to partially support the weight of the articles in the magazine and positioned to normally block feeding movement down the hopper of articles from the next adjacent magazine, a control arm pivotally mounted in the lower end of each magazine and adapted to follow the feeding movement of the last articles from the magazine, and separate means interconnecting said blocking means and control arm of each magazine, whereby the pressure exerted on the blocking means by the articles in the magazine urges said arm in the direction of said articles and thereby retains the blocking means in operative position, and when the last articles are dispensed from the magazine said arm is caused to assume a predetermined position of adjustment and effects movement of the blocking means to an inoperative position to permit feeding down the hopper of articles from the next adjacent magazine, said arm, when in the latter position, constituting a top guard for the hopper, and being maintained in such position by the weight of articles moving over said blocking means, for assisting in confining articles fed down the hopper from moving up into other empty magazines of the series, and serving to maintain the articles in the hopper in a single row formation.

7. In a gravity feed bottle vending machine for dispensing a bottle incident to actuation of coin controlled mechanism upon insertion of a coin, the combination of a series of upwardly extending magazines adapted to contain stacks of superimposed bottles, an inclined hopper in open communication with the bottom of each magazine for receiving bottles therefrom under influence of gravity, said hopper having a discharge end adjacent the lower end thereof, a plurality of transversely spaced apart inclined rods adjacent the bottom of the hopper and extending lengthwise thereof, for supporting the bottles for free feeding down the hopper toward the discharge end thereof under the influence of gravity, one of said rods being disposed in elevated relation to the others for engaging the neck portion of the bottles for guiding them in a substantially horizontal position as they feed down the hopper, delivery means in registration with the discharge end of the hopper, in a position to normally hold the bottles in the hopper in opposition to the gravity pressure exerted by said bottles, and power driven means for controlling the delivery means for dispensing a single bottle from the hopper, in response to each actuation of said drive means by the coin controlled mechanism.

8. In a gravity feed bottle vending machine for dispensing a bottle incident to actuation of coin controlled mechanism upon insertion of a coin, the combination of a series of upwardly extending magazines adapted to contain a stack of superimposed bottles, each magazine, at the bottle neck end, having a pair of converging walls for engagement by the neck end of the bottles, said magazines being of a width and the converging walls being so corelated as to cause alternate bottles to assume a slightly staggered, transversely offset relation, an inclined hopper in open communication with the bottoms of the magazines for receiving bottles therefrom under influence of gravity, said hopper having a discharge opening adjacent the lower end thereof toward which the bottles move by gravity action thereon, delivery means in said discharge opening of the hopper for normally holding bottles in the hopper in opposition to the gravity forces exerted by said bottles, and power driven means for controlling the delivery means in response to actuation of the coin controlled mechanism, whereby said delivery means effects a dispensing of a bottle from the hopper upon each actuation.

9. In a gravity feed bottle vending machine for dispensing a bottle incident to actuation of the coin controlled mechanism upon insertion of a coin, a series of upwardly extending magazines adapted to contain a stack of superimposed, substantially horizontally arranged bottles, each magazine, at the bottle neck end thereof, having a pair of converging walls for engagement by the neck end of the bottles, said magazines being of a width, and the converging walls being so corelated, as to cause alternate bottles to assume a slightly staggered, transversely offset relation.

CLYDE W. HALL.

REFERENCES CITED

The following references are of record in the file of this patent:

UNITED STATES PATENTS

| Number | Name | Date |
|---|---|---|
| 1,628,852 | Lea | May 17, 1927 |
| 1,645,236 | Hedlind | Oct. 11, 1927 |
| 1,694,436 | Bauer | Dec. 11, 1928 |
| 2,002,753 | Parks et al. | May 28, 1935 |
| 2,189,740 | Mills | Feb. 6, 1940 |
| 2,212,797 | Smith | Aug. 27, 1940 |
| 2,244,670 | Benedict | June 10, 1941 |
| 2,272,750 | Miller | Feb. 10, 1942 |
| 2,358,563 | Donaldson | Sept. 19, 1944 |
| 2,371,845 | Robison | Mar. 20, 1945 |
| 2,399,105 | Donaldson | Apr. 23, 1946 |